United States Patent
Robertson, Jr. et al.

(10) Patent No.: US 12,422,523 B2
(45) Date of Patent: Sep. 23, 2025

(54) SENSOR APPARATUS WITH CLEANING

(71) Applicant: Ford Global Technologies, LLC, Dearborn, MI (US)

(72) Inventors: Michael Robertson, Jr., Garden City, MI (US); Venkatesh Krishnan, Canton, MI (US); Tyler D. Hamilton, Farmington, MI (US); Rashaun Phinisee, Ypsilanti, MI (US); Segundo Baldovino, Novi, MI (US); Navvab Khajehosseini, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1023 days.

(21) Appl. No.: 17/495,094

(22) Filed: Oct. 6, 2021

(65) Prior Publication Data
US 2023/0104273 A1    Apr. 6, 2023

(51) Int. Cl.
| G01S 7/481 | (2006.01) |
| B60S 1/54 | (2006.01) |
| B60S 1/56 | (2006.01) |
| G01S 17/931 | (2020.01) |

(52) U.S. Cl.
CPC ............... *G01S 7/4813* (2013.01); *B60S 1/54* (2013.01); *B60S 1/56* (2013.01); *G01S 17/931* (2020.01)

(58) Field of Classification Search
CPC ...... B60S 1/56; B60S 1/54; B60S 1/60; G01S 17/931; G01S 7/4813; B08B 7/028; H04N 23/00; G03B 15/00; B60R 1/00
USPC .......................................................... 15/405
See application file for complete search history.

(56) References Cited

U.S. PATENT DOCUMENTS

| 9,796,359 B2 | 10/2017 | Field et al. |
| 10,035,498 B2 | 7/2018 | Richardson et al. |
| 2019/0202410 A1* | 7/2019 | Zhao .................. B60S 1/52 |
| 2021/0213913 A1 | 7/2021 | Hart et al. |

FOREIGN PATENT DOCUMENTS

| CN | 106623172 A | 5/2017 |
| DE | 2350967 A1 | 10/1973 |
| JP | 2017222307 A * | 12/2017 |

* cited by examiner

*Primary Examiner* — Katina N. Henson
(74) *Attorney, Agent, or Firm* — Frank A. MacKenzie; Brooks Kushman P.C.

(57) ABSTRACT

A sensor apparatus includes a sensor including a sensor lens, an air nozzle fixed relative to the sensor lens and positioned to direct airflow out of the air nozzle across the sensor lens, and a fin positioned inside the air nozzle. The fin is rotatably coupled to the air nozzle and rotatable relative to the air nozzle around an axis of rotation. The fin is elongated radially from the axis of rotation. The fin is rotatable between a first position impeding airflow through the air nozzle and a second position permitting airflow through the air nozzle.

17 Claims, 12 Drawing Sheets

SENSOR APPARATUS WITH CLEANING

BACKGROUND

Vehicles typically include sensors. The sensors can provide data about operation of the vehicle, for example, wheel speed, wheel orientation, and engine and transmission data (e.g., temperature, fuel consumption, etc.). The sensors can detect the location and/or orientation of the vehicle. The sensors can be global positioning system (GPS) sensors; accelerometers such as piezo-electric or microelectromechanical systems (MEMS); gyroscopes such as rate, ring laser, or fiber-optic gyroscopes; inertial measurements units (IMU); and/or magnetometers. The sensors can detect the external world, e.g., objects and/or characteristics of surroundings of the vehicle, such as other vehicles, road lane markings, traffic lights and/or signs, pedestrians, etc. For example, the sensors can be radar sensors, scanning laser range finders, light detection and ranging (LIDAR) devices, and/or image processing sensors such as cameras.

DETAILED DESCRIPTION

Figure 1:
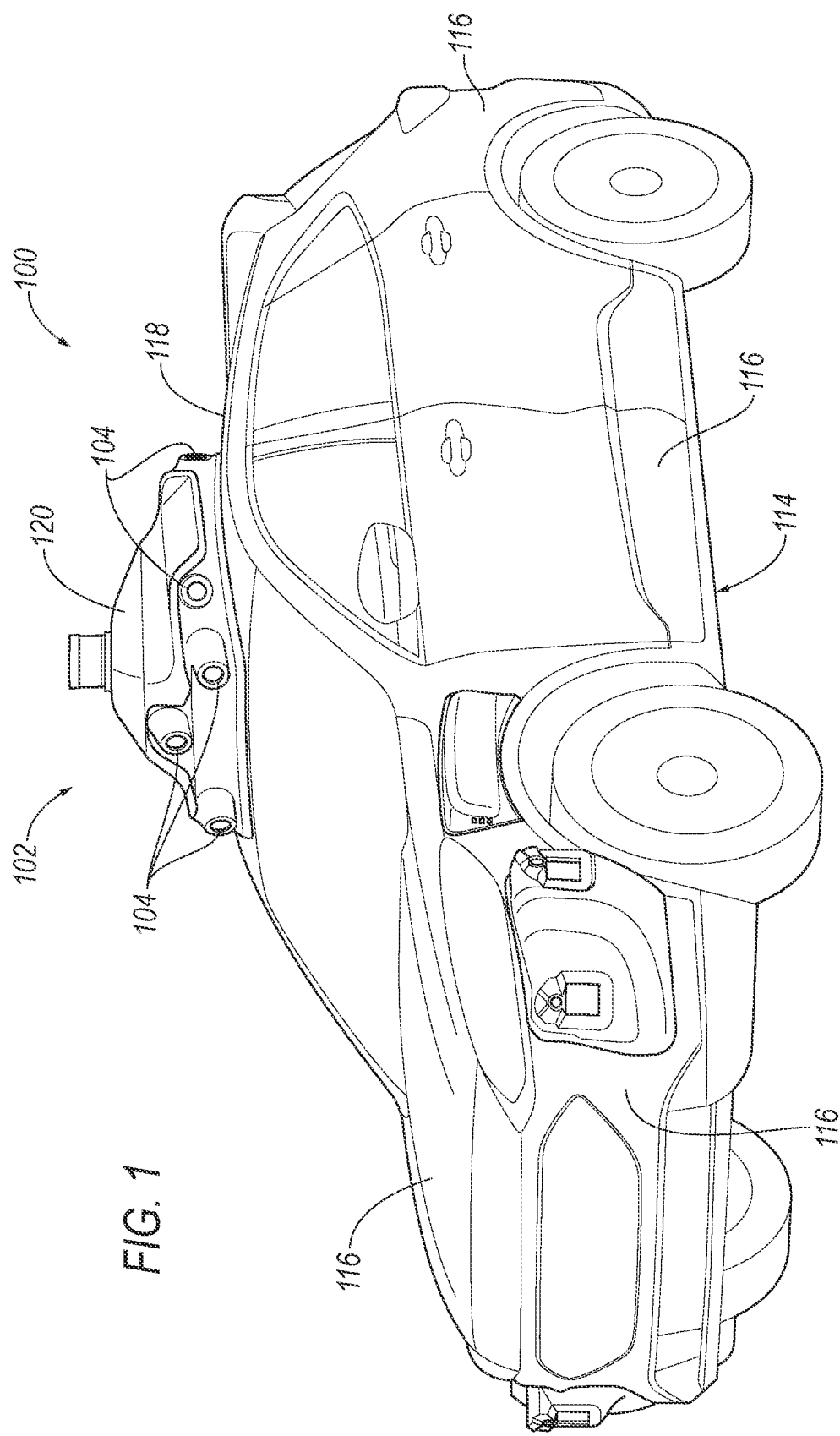
FIG. 1 is a perspective view of an example vehicle with an example sensor apparatus.

A sensor apparatus includes a sensor including a sensor lens, an air nozzle fixed relative to the sensor lens and positioned to direct airflow out of the air nozzle across the sensor lens, and a fin positioned inside the air nozzle. The fin is rotatably coupled to the air nozzle and rotatable relative to the air nozzle around an axis of rotation. The fin is elongated radially from the axis of rotation. The fin is rotatable between a first position impeding airflow through the air nozzle and a second position permitting airflow through the air nozzle.

The air nozzle may include an outlet having a slot shape. The slot shape of the outlet may be elongated parallel to the sensor lens.

The axis of rotation may be perpendicular to a direction of airflow traveling through the air nozzle.

The air nozzle may include four walls arranged to form a rectangular cross-section at the axis of rotation. The fin may be elongated radially from the axis of rotation to a terminus of the fin, the terminus may be positioned against a first wall of the walls when the fin is in the first position, and the terminus may be spaced from the walls when the fin is in the second position. The fin may be rotatable about the axis to a third position, the terminus may be positioned against a second wall of the walls when the fin is in the third position, and the second wall may be opposite the first wall. The fin may be elongated along the axis of rotation from a third wall of the walls to a fourth wall of the walls, the fourth wall may be opposite the third wall, and the third wall and fourth wall may both extend from the first wall to the second wall.

The sensor apparatus may further include a shaft extending around the axis of rotation, and a counterweight fixed to the shaft and extending radially from the shaft in an opposite direction as the fin is elongated from the axis of rotation, and the fin may be fixed to the shaft. The counterweight may be sized to bias the fin toward the second position when the fin is in the first position, and the counterweight may be sized to bias the fin toward the second position when the fin is in the third position.

The first wall may be positioned to block the fin from rotating farther from the second position than the first position is located, and the second wall may be positioned to block the fin from rotating farther from the second position than the third position is located.

The sensor apparatus may further include a shaft extending around the axis of rotation, and a plurality of fins including the fin, and the fins may be fixed to the shaft, and each of the fins may be elongated radially a same distance from the shaft to a respective terminus. At least one of the terminuses of the fins may be positioned against the second wall at each rotational position of the shaft around the axis of rotation.

The second wall may include a partial cylindrical section radially centered on the axis of rotation.

The shaft and the fins may be freely rotatable together for 360° around the axis.

The sensor apparatus may further include a spring coupled to the air nozzle and the fin, and the spring may be positioned to rotationally bias the fin toward the second position.

The sensor apparatus may further include a blower and a duct positioned to direct airflow from the blower to the air nozzle. The sensor lens may be a first sensor lens, the air nozzle may be a first air nozzle, the fin may be a first fin, the duct may be a first duct, the sensor apparatus may further include a second sensor lens, a second air nozzle fixed relative to the second sensor lens and positioned to direct airflow out of the second air nozzle across the second sensor lens, a second fin positioned inside the air nozzle, and a second duct positioned to direct airflow from the blower to the second air nozzle. The sensor apparatus may further include a housing, and the blower, the first duct, and the second duct may be positioned inside the housing. The housing may include an exterior wall, the first sensor lens may define a field of view through the exterior wall, and the second sensor lens may define a field of view through the exterior wall.

With reference to the Figures, wherein like numerals indicate like parts throughout the several views, a sensor apparatus 102 for a vehicle 100 includes at least one sensor 112 including a respective sensor lens 104, at least one air nozzle 106 fixed relative to the respective sensor lens 104 and positioned to direct airflow out of the at least one air nozzle 106 across the respective sensor lens 104, and at least one fin 108 positioned inside the respective air nozzle 106. The at least one fin 108 is rotatably coupled to the respective air nozzle 106 and rotatable relative to the respective air nozzle 106 around a respective axis of rotation R. The at least one fin 108 is elongated radially from the respective rotation axis R. The at least one fin 108 is rotatable between a first position impeding airflow through the respective air nozzle 106 and a second position permitting airflow through the respective air nozzle 106.

The rotation of the at least one fin 108 between the first position and the second position temporarily impedes the airflow through the respective air nozzle 106. As a result, the airflow reaching the respective sensor lens 104 is pulsed, i.e., fluctuates up and down in terms of velocity. The pulsed airflow is more effective at removing small water droplets from the respective sensor lens 104 than constant airflow. For example, airflow with a constant velocity of 20 meters per second (m/s) may fairly consistently remove a water droplet with a diameter of 2 millimeters but may remove a water droplet with a diameter of 0.5 millimeters less quickly or consistently. The pulsed airflow may remove the smaller water droplet more quickly and consistently than the constant airflow. Moreover, the pulsed airflow can have a greater maximum velocity than the constant airflow with a same pressure source 130 supplying the air nozzle 106, which may more effectively remove debris. Keeping the sensor lenses 104 clearer of water and/or debris may provide more accurate data from the respective sensors 112 including the sensor lenses 104.

With reference to FIG. 1, the vehicle 100 may be any passenger or commercial automobile such as a car, a truck, a sport utility vehicle, a crossover, a van, a minivan, a taxi, a bus, etc.

The vehicle 100 may be an autonomous vehicle. A computer can be programmed to operate the vehicle 100 independently of the intervention of a human operator, completely or to a lesser degree. The computer may be programmed to operate a propulsion, a brake system, a steering system, and/or other vehicle systems based at least in part of data received from the sensors 112. For the purposes of this disclosure, autonomous operation means the computer controls the propulsion, brake system, and steering system without input from a human operator; semi-autonomous operation means the computer controls one or two of the propulsion, brake system, and steering system and a human operator controls the remainder; and nonautonomous operation means a human operator controls the propulsion, brake system, and steering system.

The vehicle 100 includes a body 114. The vehicle 100 may be of a unibody construction, in which a frame and the body 114 of the vehicle 100 are a single component. The vehicle 100 may, alternatively, be of a body-on-frame construction, in which the frame supports the body 114 that is a separate component from the frame. The frame and body 114 may be formed of any suitable material, for example, steel, aluminum, etc. The body 114 includes body panels 116 partially defining an exterior of the vehicle 100. The body panels 116 may present a class-A surface, e.g., a finished surface exposed to view by a customer and free of unaesthetic blemishes and defects. The body panels 116 include, e.g., a roof 118, etc.

A housing 120 for the sensors 112 is attachable to the vehicle 100, e.g., to one of the body panels 116 of the vehicle 100, e.g., the roof 118. For example, the housing 120 may be shaped to be attachable to the roof 118, e.g., may have a shape matching or following a contour of the roof 118. The housing 120 may be attached to the roof 118, which can provide the sensors 112 with unobstructed fields of view of areas around the vehicle 100. The housing 120 may be formed of, e.g., plastic or metal.

Figure 2:
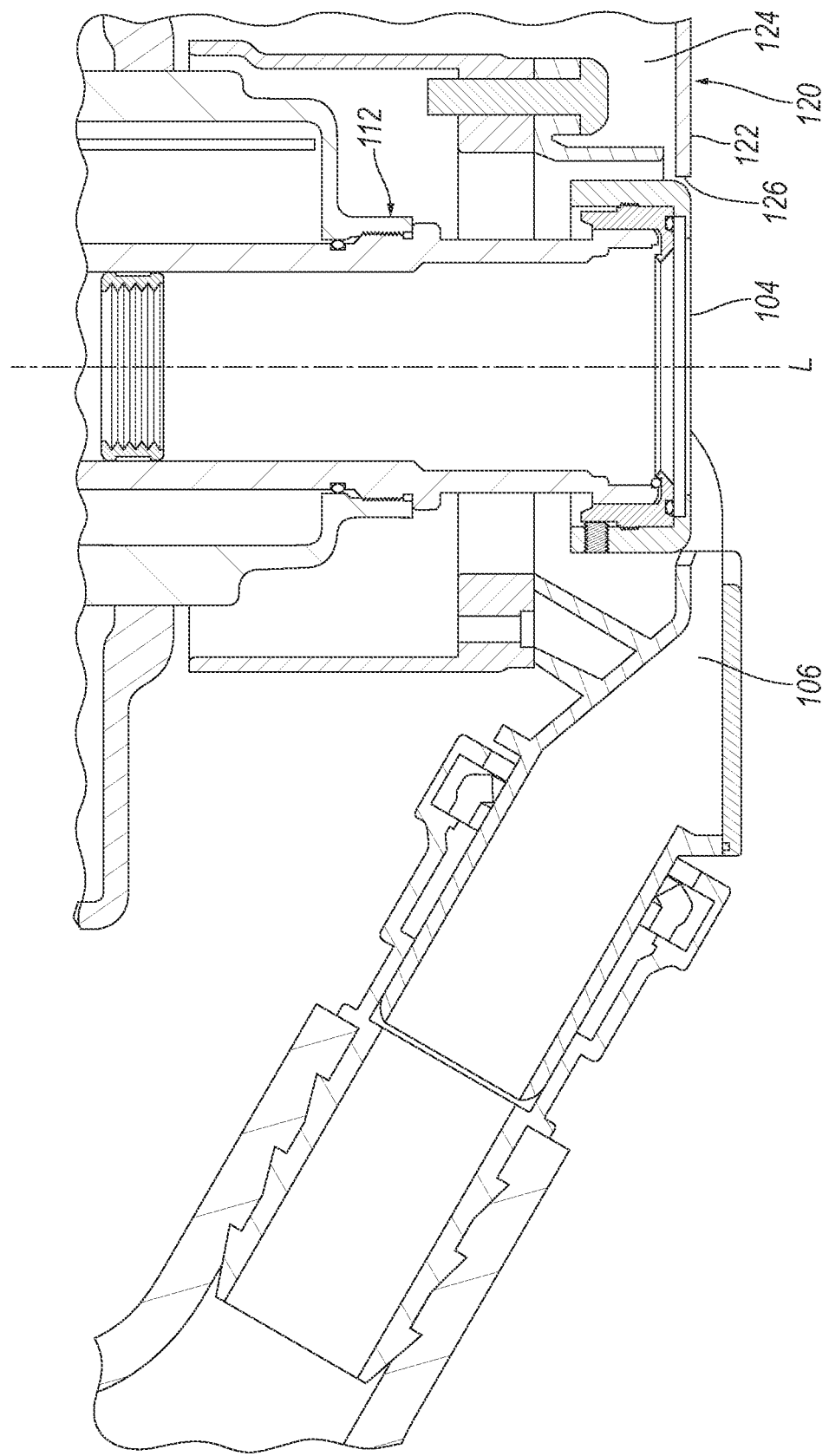
FIG. 2 is a top cross-sectional view of an example sensor in the sensor apparatus.

With reference to FIG. 2, the housing 120 includes one or more exterior walls 122 partially forming a chamber 124 inside the housing 120. The exterior walls 122 form an exterior of the housing 120 and are exposed to the ambient environment.

The housing 120 includes apertures 126. The apertures 126 are holes in the housing 120 leading from the chamber 124 to the ambient environment. The apertures 126 are through the exterior walls 122. The apertures 126 are circular in shape. The housing 120 includes one aperture 126 for each of the sensors 112. Each sensor 112 has a field of view defined by the sensor lens 104 through the respective aperture 126 through the respective exterior wall 122.

The sensors 112 may detect the external world, e.g., objects and/or characteristics of surroundings of the vehicle 100, such as other vehicles, road lane markings, traffic lights and/or signs, pedestrians, etc. For example, the sensors 112 may include radar sensors, scanning laser range finders, light detection and ranging (LIDAR) devices, and image processing sensors such as cameras. As cameras, the sensors 112 can detect electromagnetic radiation in some range of wavelengths. For example, the sensors 112 may detect visible light, infrared radiation, ultraviolet light, or some range of wavelengths including visible, infrared, and/or ultraviolet light. For example, the sensors 112 can be a charge-coupled devices (CCD), complementary metal oxide semiconductors (CMOS), or any other suitable type. For another example, the sensors 112 may be time-of-flight (TOF) cameras, which include a modulated light source for illuminating the environment and detect both reflected light from the modulated light source and ambient light to sense reflectivity amplitudes and distances to the scene.

The sensors 112 include the respective sensor lenses 104. The sensor lenses 104 may be convex. Each sensor lens 104 may define the field of view of the respective sensor 112 through the aperture 126 through the exterior wall 122. Each sensor lens 104 defines a lens axis L, around which the sensor lens 104 is radially symmetric. The lens axis L extends along a center of the field of view of the respective sensor 112.

Figure 3:
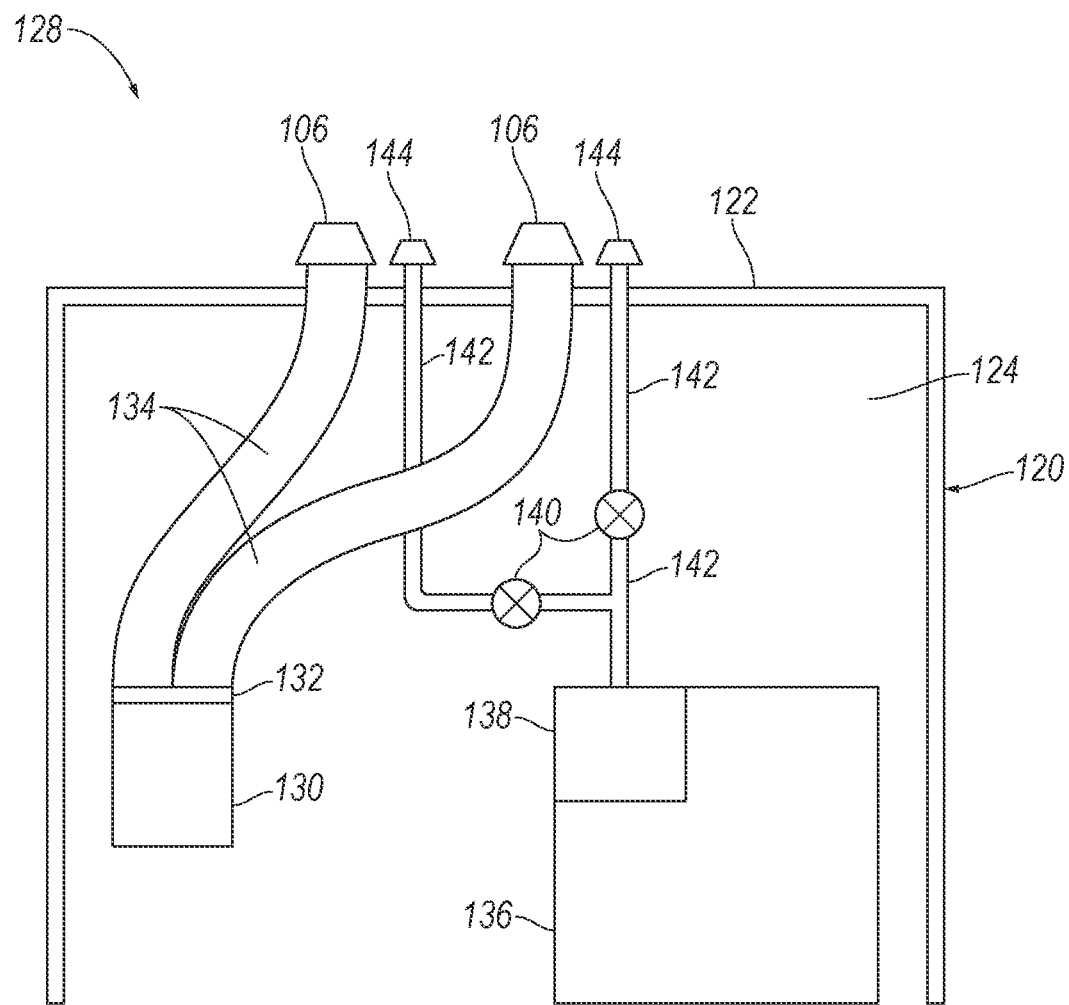
FIG. 3 is a diagram of an example cleaning system of the sensor apparatus.

With reference to FIG. 3, the sensor apparatus 102 includes a cleaning system 128. The cleaning system 128 includes the pressure source 130, a filter 132, ducts 134, and the air nozzles 106. The pressure source 130 and the air nozzles 106 are fluidly connected to each other (i.e., fluid can flow from one to the other) through the ducts 134. The pressure source 130, the filter 132, and the ducts 134 can be positioned inside the housing 120, e.g., in the chamber 124.

The pressure source 130 forces air through the ducts 134. The pressure source 130 may be any suitable type of blower 110, e.g., a positive-displacement compressor such as a reciprocating, ionic liquid piston, rotary screw, rotary vane, rolling piston, scroll, or diaphragm compressor; a dynamic compressor such as an air bubble, centrifugal, diagonal, mixed-flow, or axial-flow compressor; a fan; or any other suitable type. The pressure source 130 can be positioned to draw air from an ambient environment outside the housing 120 and to blow the air into the ducts 134. The pressure source 130 can be sized to provide air for cleaning multiple sensors 112, e.g., two sensors 112.

The filter 132 can remove solid particulates such as dust, pollen, mold, dust, and bacteria from air flowing through the filter 132. The filter 132 may be any suitable type of filter, e.g., paper, foam, cotton, stainless steel, oil bath, etc.

The ducts 134 can be positioned to direct airflow from the blower 110 to the air nozzles 106. For example, the ducts 134 can extend from the blower 110 to the respective air nozzles 106, e.g., a first duct 134 to a first air nozzle 106 and a second duct 134 to a second air nozzle 106. The ducts 134 may be, e.g., flexible tubes.

Returning to FIG. 2, the air nozzles 106 are fixed relative to the respective sensor lenses 104. The air nozzles 106 can be positioned to direct airflow out of the air nozzles 106 across the respective sensor lenses 104, e.g., may be aimed at the respective sensor lenses 104 at an oblique angle.

With reference again to FIG. 3, the cleaning system 128 can further include a reservoir 136, a pump 138, valves 140, supply lines 142, and liquid nozzles 144. The reservoir 136, the pump 138, and the liquid nozzles 144 are fluidly connected to each other, i.e., fluid can flow from one to the other, via the supply lines 142. The cleaning system 128 distributes washer fluid stored in the reservoir 136 to the liquid nozzles 144. "Washer fluid" is any liquid stored in the reservoir 136 for cleaning. The washer fluid may include solvents, detergents, diluents such as water, etc.

The reservoir 136 may be a tank fillable with liquid, e.g., washer fluid for window cleaning. The reservoir 136 may be disposed in a front of the vehicle 100, e.g., in an engine compartment forward of a passenger cabin, or may be disposed in the housing 120. The reservoir 136 may store the washer fluid only for supplying the sensor apparatus 102 or also for other purposes, such as supply to the windshield.

The pump 138 may force the washer fluid through the supply lines 142 to the liquid nozzles 144 with sufficient pressure that the washer fluid sprays from the liquid nozzles 144. The pump 138 is fluidly connected to the reservoir 136. The pump 138 may be attached to or disposed in the reservoir 136. The pump 138 may be sized to provide washer fluid to multiple liquid nozzles 144, e.g., two liquid nozzles 144.

Each valve 140 is positioned and operable to control fluid flow from the pump 138 to one of the liquid nozzles 144. Specifically, fluid from the supply line 142 from the pump 138 must flow through one of the valves 140 to reach the respective supply line 142 providing fluid to the respective liquid nozzle 144. The valves 140 control flow by being actuatable between an open position permitting flow and a closed position blocking flow from the incoming to the outgoing of the supply lines 142. The valves 140 can be solenoid valves. As a solenoid valve, each valve 140 includes a solenoid and a plunger. Electrical current through the solenoid generates a magnetic field, and the plunger moves in response to changes in the magnetic field. The solenoid moves the plunger between a position in which the valve 140 is open and a position in which the valve 140 is closed.

The supply lines 142 extend from the pump 138 to the liquid nozzles 144. The supply lines 142 may be, e.g., flexible tubes or hoses.

Figure 4:
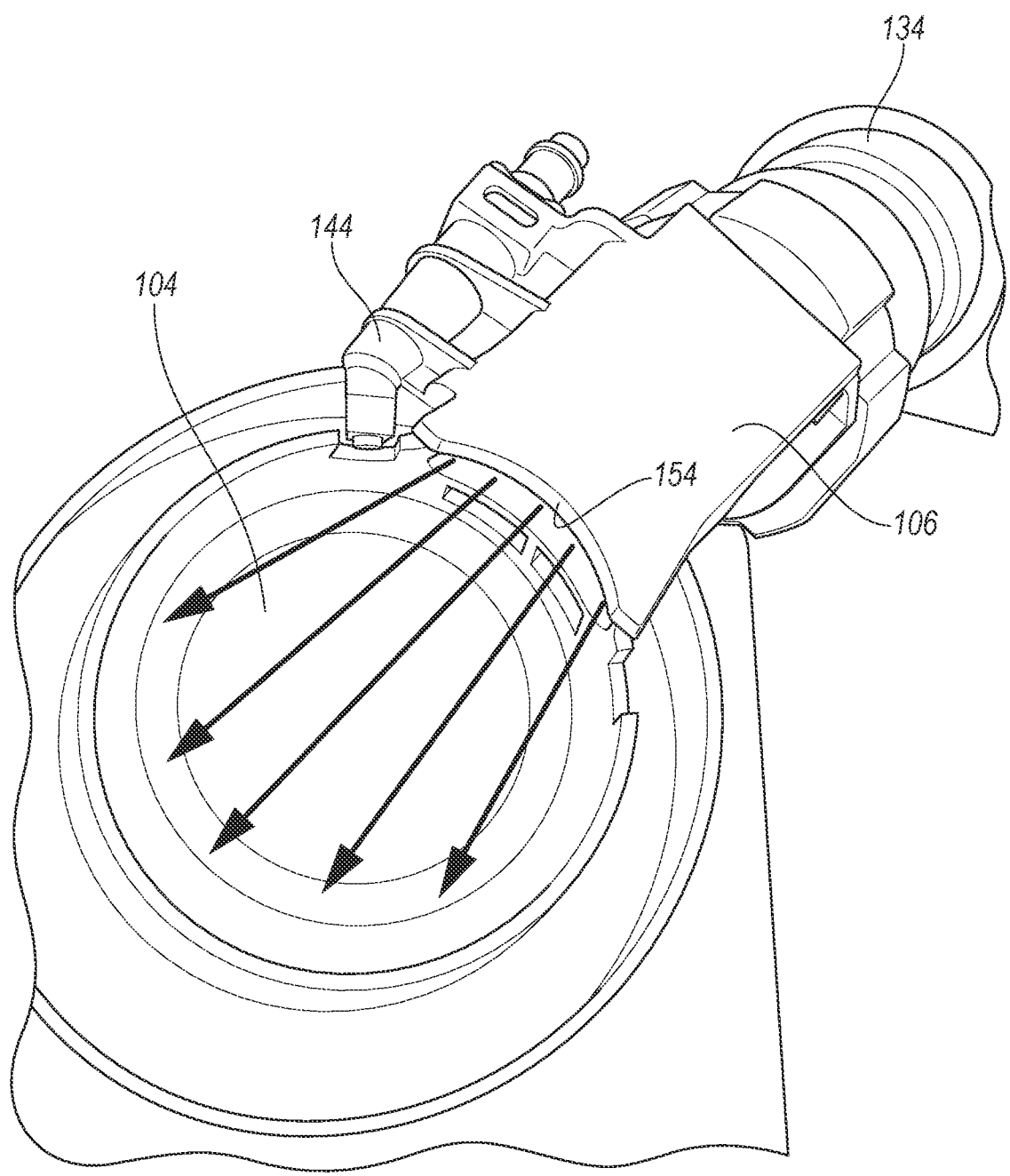
FIG. 4 is a plan view of the sensor and example nozzles.

With reference to FIG. 4, the liquid nozzles 144 are fixed relative to the respective sensor lenses 104. The liquid nozzles 144 can be positioned to direct washer fluid out of the liquid nozzles 144 onto the respective sensor lenses 104, e.g., may be aimed at the respective sensor lenses 104 at an oblique angle.

Figure 5:
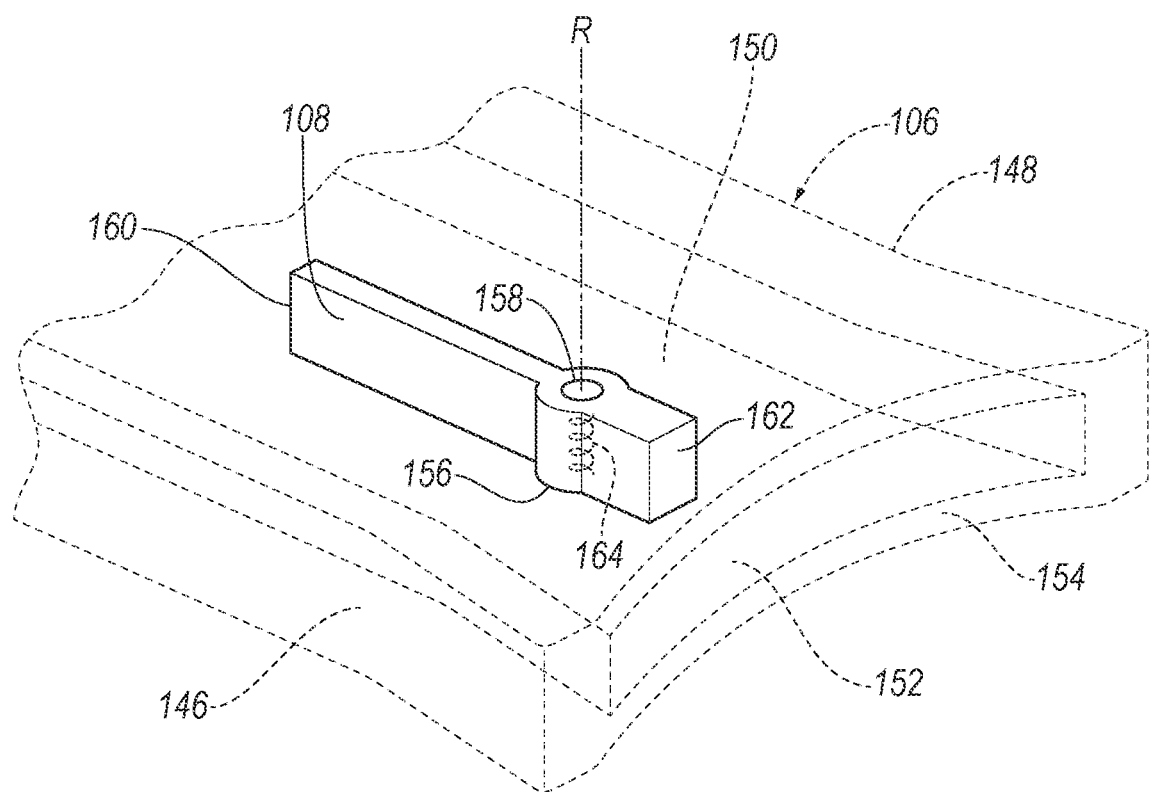
FIG. 5 is a perspective view of a first example of an air nozzle with a fin.
Figure 7:
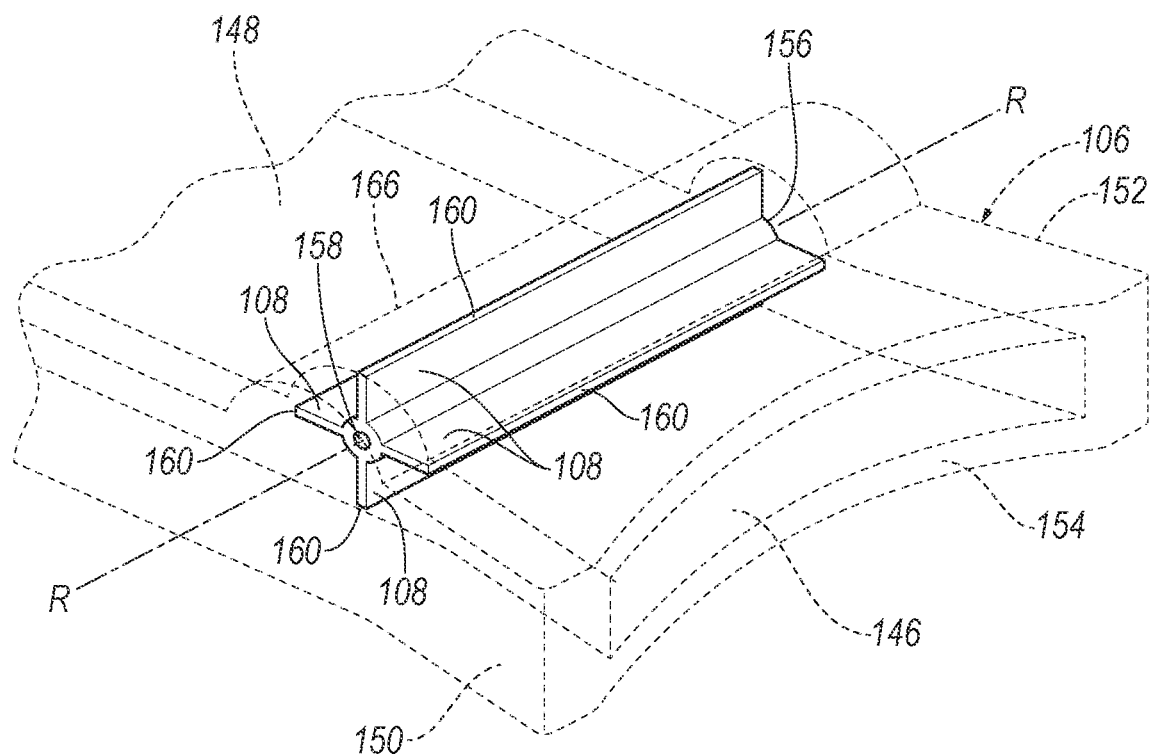
FIG. 7 is a perspective view of a second example of the air nozzle with the fin.

FIGS. 5 and 7 show respective examples of the configuration of the fin 108 and the air nozzle 106, and the following description applies to both examples. The description below applies to the air nozzle 106 and fin 108 for one sensor 112, but the sensor apparatus 102 can include multiple sensors 112 and respective air nozzles 106 and fins 108 for each of those sensors 112.

The air nozzle 106 can include four walls 146, 148, 150, 152 arranged to form a rectangular cross-section at the rotation axis R, i.e., a plane defining the rectangular cross-section includes the rotation axis R. The four walls 146, 148, 150, 152 include a first wall 146, a second wall 148, a third wall 150, and a fourth wall 152. The second wall 148 is opposite the first wall 146, i.e., forms an opposite side of the air nozzle 106 as the first wall 146 does, and the fourth wall 152 is opposite the third wall 150. The first wall 146 and the second wall 148 are spaced from each other, and the third wall 150 and the fourth wall 152 are spaced from each other. The first wall 146 and the second wall 148 both extend, e.g., straight, from the third wall 150 to the fourth wall 152, and the third wall 150 and the fourth wall 152 both extend, e.g., straight, from the first wall 146 to the second wall 148.

The air nozzle 106 includes an outlet 154 having a slot shape, i.e., is significantly longer in a first direction than in an orthogonal second direction. The slot shape of the outlet 154 can be elongated parallel to the sensor lens 104, i.e., elongated in a plane orthogonal to the lens axis L defined by the sensor lens 104. The outlet 154 can be elongated along a circumferential path around the lens axis L at a constant radius from the lens axis L. The outlet 154 can be formed by two of the walls 146, 148, 150, 152 extending along the direction of elongation and the other two of the walls 146, 148, 150, 152 extending perpendicular to the direction of elongation.

The sensor apparatus 102 includes a shaft 156 extending around the rotation axis R inside the air nozzle 106. The shaft 156 can be elongated along the rotation axis R from one of the walls 146, 148, 150, 152 to an opposite one of the walls 146, 148, 150, 152. The shaft 156 is configured to rotate freely around the rotation axis R relative to the air nozzle 106. For example, the shaft 156 can be hollow and extend circumferentially around a pin 158 fixed relative to the air nozzle 106 and can freely move concentrically around the pin 158. For another example, the shaft 156 can include cylindrical pegs (not shown) extending into slots (not shown) in the walls 146, 148, 150, 152 of the air nozzle 106, and the pegs can freely move concentrically within the slots.

The fin 108 is fixed to shaft 156 and rotates together with the shaft 156. For example, the shaft 156 and the fin 108 can be integral, i.e., made of a single, uniform piece of material with no seams, joints, fasteners, or adhesives holding them together. For another example, the fin 108 can be adhered or affixed or fused to the shaft 156. The fin 108 is positioned inside the air nozzle 106 with the shaft 156.

The fin 108 is elongated radially from the shaft 156, i.e., radially outward from the rotation axis R, to a terminus 160 of the fin 108. The terminus 160 is the farthest most surface of the fin 108 from the rotation axis R. The fin 108 can be elongated axially along the rotation axis R from the third wall 150 to the fourth wall 152, i.e., is sufficiently close to the third wall 150 and to the fourth wall 152 that airflow between the fin 108 and the third wall 150 or fourth wall 152 is negligible. The fin 108 can have a thickness perpendicular to rotation axis R and perpendicular to the direction of elongation from the shaft 156 to the terminus 160. The thickness can be less, e.g., significantly less, than a length from the shaft 156 to the terminus 160 and than a length from the third wall 150 to the fourth wall 152. The fin 108 can be flat, and the thickness can be approximately constant from the shaft 156 to the terminus 160 and from the third wall 150 to the fourth wall 152.

The fin 108 is rotatably coupled to the air nozzle 106 via the shaft 156. The fin 108 is rotatable with the shaft 156 relative to the air nozzle 106 around the rotation axis R. The rotation axis R is perpendicular to the direction of airflow traveling through the air nozzle 106.

With reference to FIGS. 6A-C and 8A-C, the fin 108 can be rotatable about the rotation axis R between a first position, a second position, and a third position. In the first position, shown in FIGS. 6A and 8A, the terminus 160 of the fin 108 is positioned against the first wall 146, and the fin 108 impedes airflow through the air nozzle 106. In the second position, shown in FIGS. 6B and 8B, the terminus 160 of the fin 108 is spaced from the first wall 146 and second wall 148, and the fin 108 permits airflow through the air nozzle 106. In the third position, shown in FIGS. 6C and 8C, the terminus 160 of the fin 108 is positioned against the second wall 148.

Now referring specifically to the example of FIG. 5, the sensor apparatus 102 includes a single fin 108 fixed to the shaft 156. The length of the fin 108 from the shaft 156 to the terminus 160 is greater than a distance from the shaft 156 to the first wall 146 and greater than a distance from the shaft 156 to the second wall 148. The rotation axis R can extend parallel to the lens axis L. The rotation axis R can extend transverse, e.g., perpendicular, to the direction of elongation of the outlet 154 of the air nozzle 106. The first wall 146 and the second wall 148 can extend perpendicular to the direction of elongation of the outlet 154, and the third wall 150 and the fourth wall 152 can extend along the direction of elongation of the outlet 154.

Figure 6A:
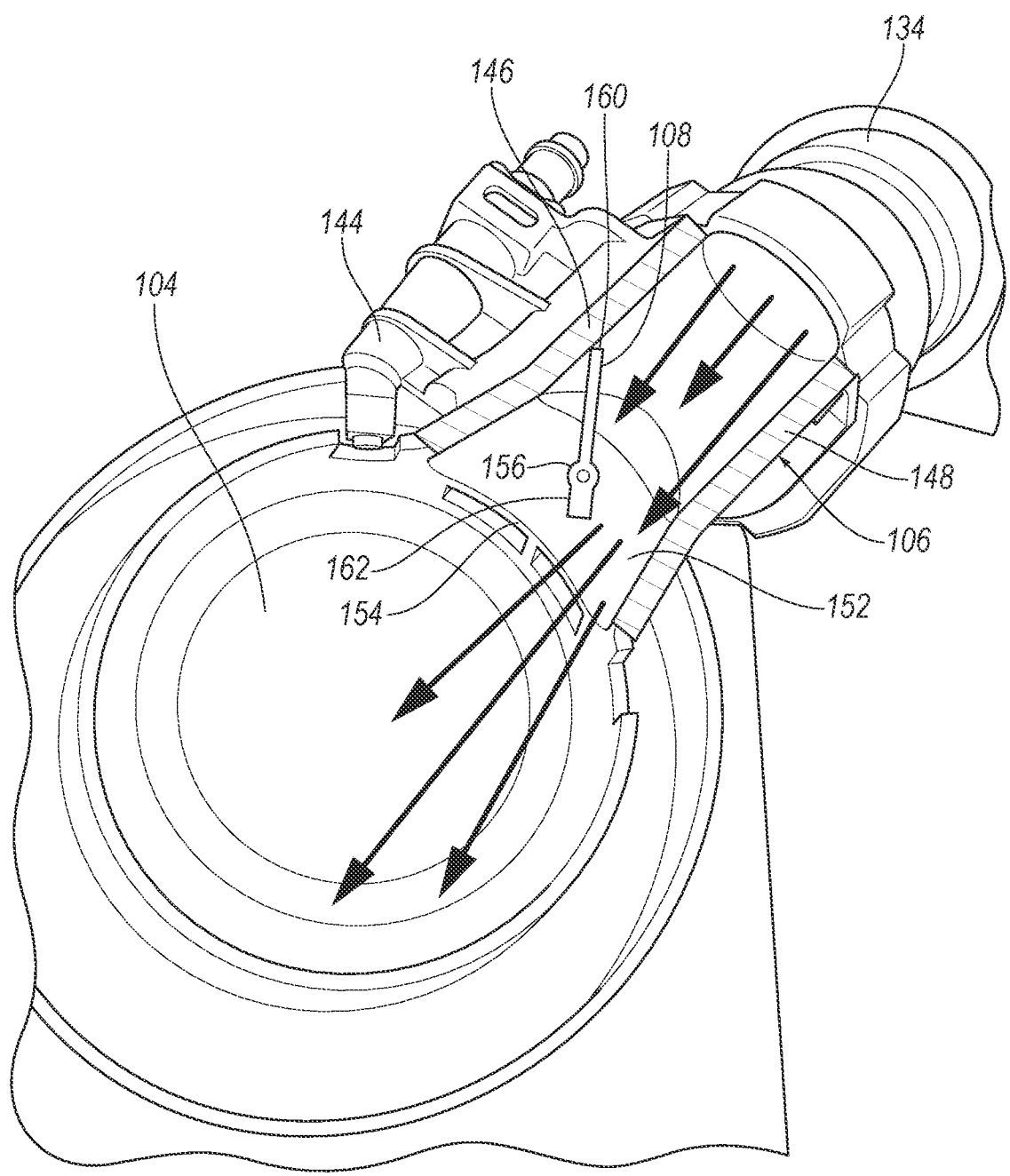
FIG. 6A is a plan cross-sectional view of the first example of the air nozzle with the fin in a first position.
Figure 6B:
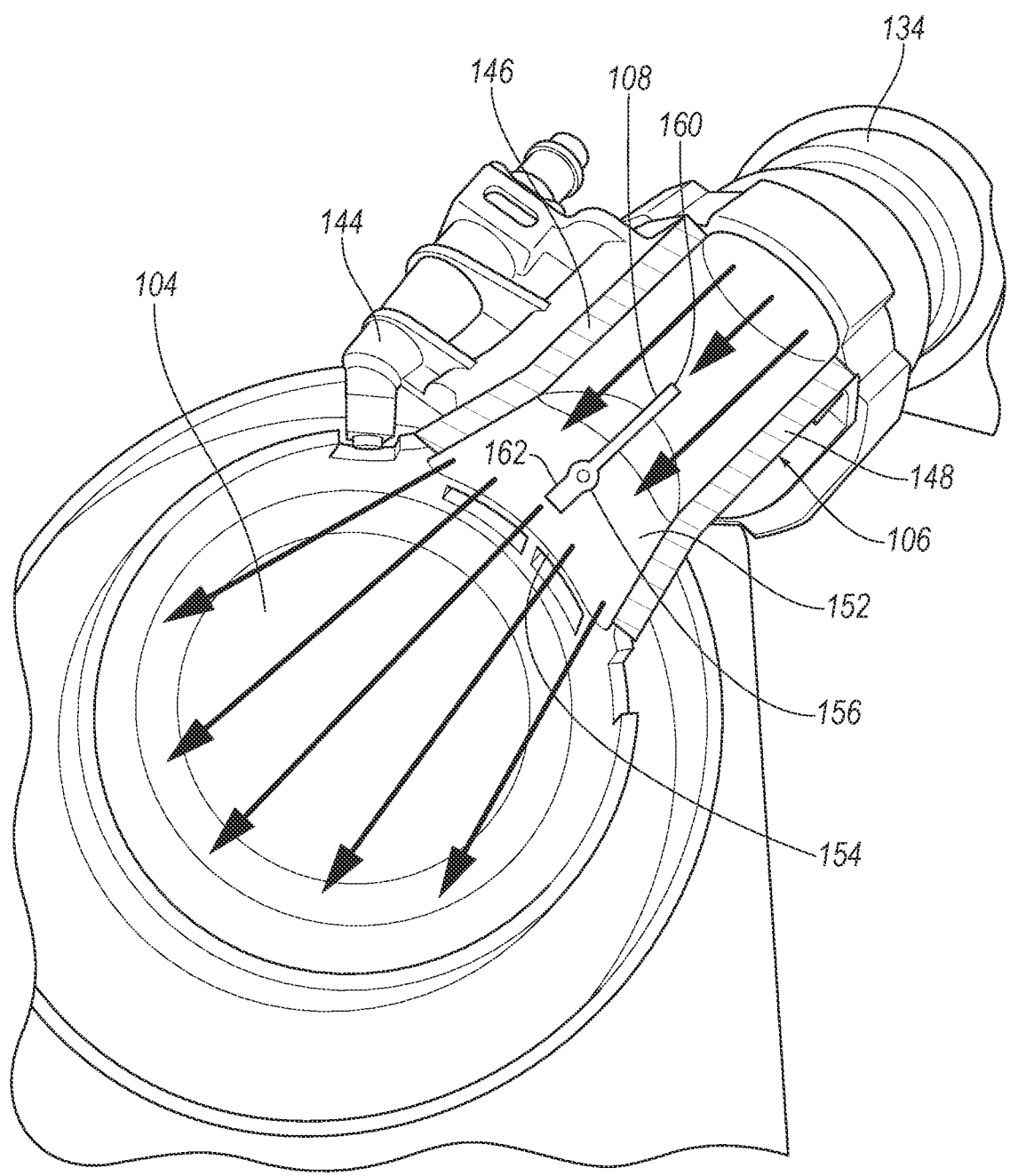
FIG. 6B is a plan cross-sectional view of the first example of the air nozzle with the fin in a second position.
Figure 6C:
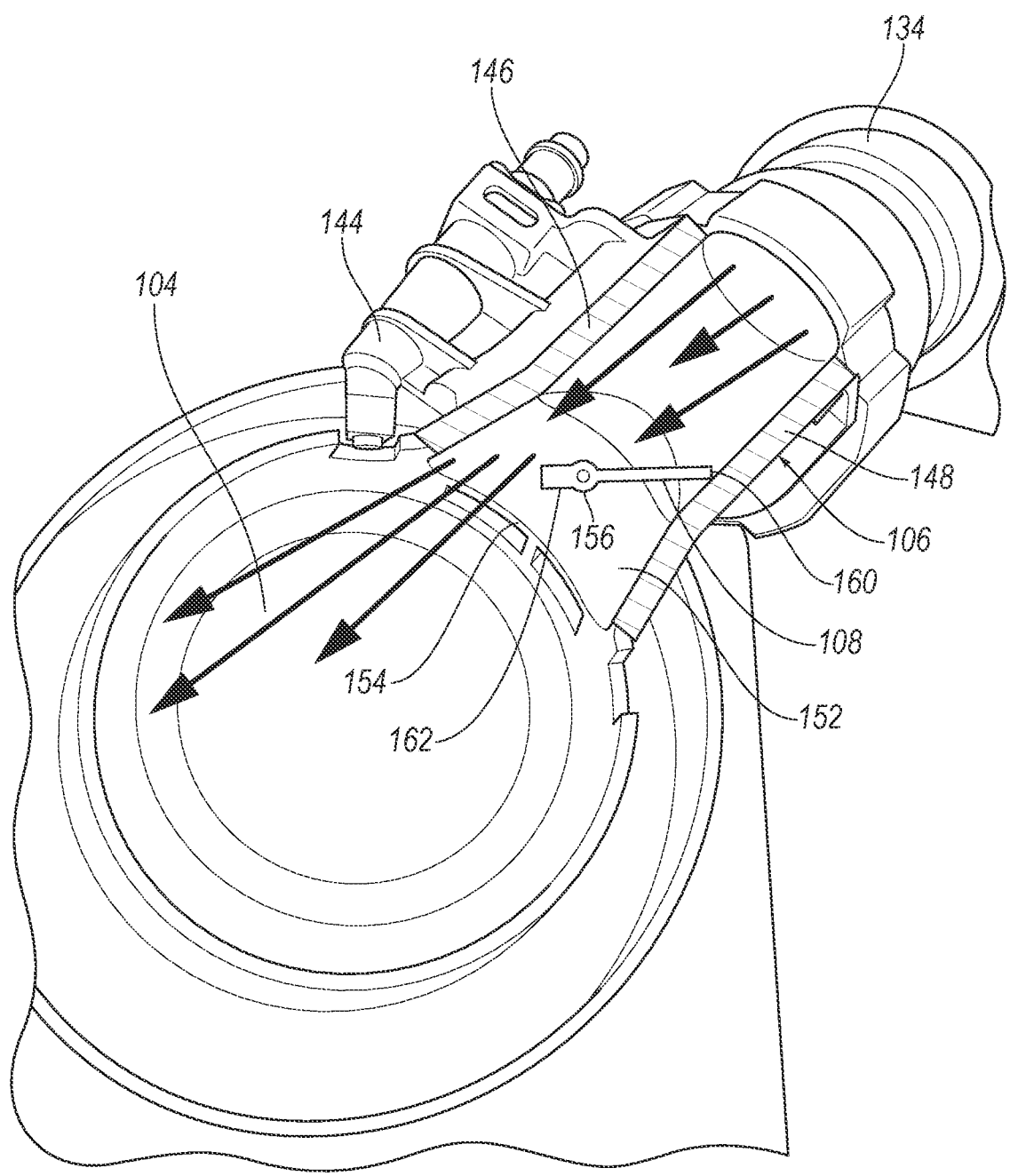
FIG. 6C is a plan cross-sectional view of the first example of the air nozzle with the fin in a third position.

With reference to FIGS. 6A-C, the fin 108 is rotatable between the first position, shown in FIG. 6A, in which the terminus 160 abuts the first wall 146; the second position, shown in FIG. 6B, in which the terminus 160 is spaced from the first wall 146 and from the second wall 148; and the third position, shown in FIG. 6C, in which the terminus 160 abuts the second wall 148. The first wall 146 is positioned to block the fin 108 from rotating farther from the second position than the first position is located, and the second wall 148 is positioned to block the fin 108 from rotating farther from the second position than the third position is located.

The fin 108 can be biased toward the second position. In other words, when the fin 108 is in the first position, the shaft 156 can have a tendency to rotate clockwise as viewed in FIG. 6A toward the second position, and when the fin 108 is in the third position, the shaft 156 can have a tendency to rotate counterclockwise as viewed in FIG. 6C toward the second position.

For example, the sensor apparatus 102 can include a counterweight 162 fixed to the shaft 156. The counterweight 162 can extend radially from the shaft 156 in an opposite direction as the fin 108 is elongated from the rotation axis R. The counterweight 162 is sized to bias the fin 108 toward the second position when the fin 108 is in the first position or third position. For example, the counterweight 162 can have a weight and a surface area against which the airflow pushes when the fin 108 is in the first or third positions. The weight and surface area of the counterweight 162 can be chosen so that, when the fin 108 is in the first or third positions, the combined torque around the rotation axis R from the counterweight 162 pushing the fin 108 toward the second position is greater than the torque of the airflow against the fin 108 pushing the fin 108 away from the second position.

Alternatively or additionally, the sensor apparatus 102 can include a spring 164 coupled to the air nozzle 106 and the fin 108. The spring 164 may be any suitable type of spring 164, e.g., a torsion spring. The spring 164 is positioned to rotationally bias the fin 108 toward the second position. For example, the spring 164 can be in one of tension or compression when the fin 108 is in the first position, the spring 164 can be in the other of tension or compression when the fin 108 is in the third position, and the spring 164 can be in a neutral position when the fin 108 is in the second position.

As air flows through the air nozzle 106, the fin 108 rotates from the first position to the second position to the third position, then reverses direction and rotates from the third position to the second position to the first position, and so on. When the fin 108 is in the first position, the fin 108 impedes airflow by blocking approximately a first half of the cross-section of the air nozzle 106 while permitting airflow through approximately a second half of the cross-section of the air nozzle 106 opposite the first half. When the fin 108 is in the third position, the fin 108 impedes airflow by blocking approximately the second half of the cross-section of the air nozzle 106 while permitting airflow through approximately the first half. When the fin 108 is in the second position, the fin 108 permits airflow through the nozzle on both sides of the fin 108. As the fin 108 oscillates, the velocity of the airflow fluctuates between a higher velocity when airflow is only permitted through half of the air nozzle 106 (i.e., the first and third positions) and a lower velocity when airflow is permitted through most of the air nozzle 106 (i.e., the second position).

Now referring specifically to the example of FIG. 7, the sensor apparatus 102 can include a plurality of fins 108, e.g., four fins 108 including a first fin 108a, a second fin 108b, a third fin 108c, and a fourth fin 108d. Each of the fins 108 is elongated radially a same distance from the shaft 156 to the respective terminus 160. The fins 108 can be rotationally symmetric to each other around the rotation axis R. The first wall 146 and the second wall 148 can extend along the direction of elongation of the outlet 154, and the third wall 150 and the fourth wall 152 can extend perpendicular to the direction of elongation of the outlet 154. The distance from the shaft 156 to the terminus 160 can be slightly shorter than the distance from the shaft 156 to the first wall 146, permitting the fins 108 to freely rotate past the first wall 146. When the respective fin 108 is in the first position, e.g., the first fin 108a in FIG. 8A, so that the terminus 160 is against the first wall 146, the terminus 160 is sufficiently close that airflow between the terminus 160 and the first wall 146 is negligible.

The second wall 148 can include a partial cylindrical section 166 radially centered on the rotation axis R. The partial cylindrical section 166 can extend along the rotation axis R from the third wall 150 to the fourth wall 152. The partial cylindrical section 166 can extend circumferentially around the rotation axis R, e.g., for approximately 180°. The inner radius of the partial cylindrical section 166 is slightly greater than the distance from the rotation axis R to one of the terminuses 160, permitting the fins 108 to freely rotate past the second wall 148. When the terminus 160 of one of the fins 108 is against the partial cylindrical section 166 of the second wall 148, the terminus 160 is sufficiently close that airflow between the terminus 160 and the partial cylindrical section 166 is negligible.

Figure 8A:
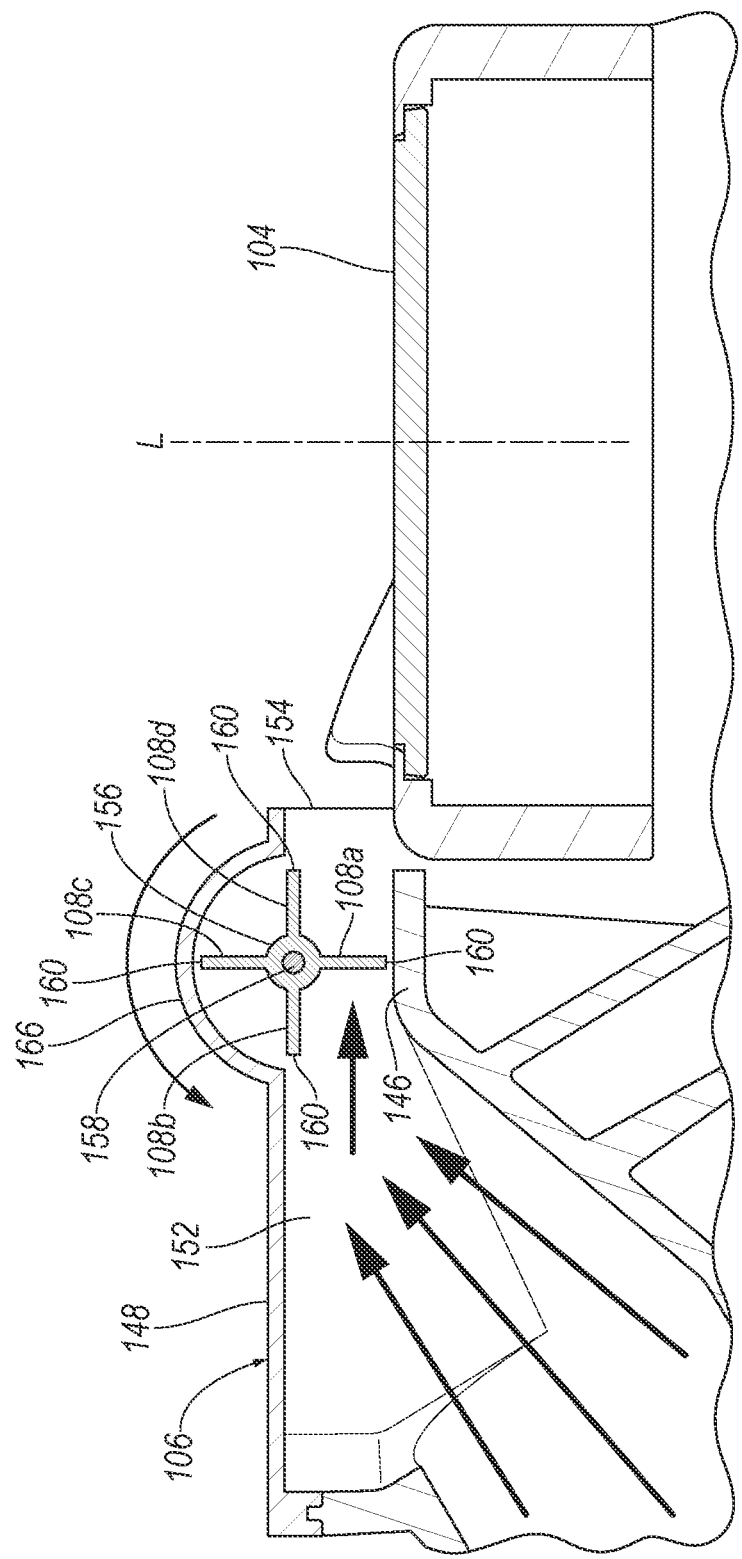
FIG. 8A is a side cross-sectional view of the second example of the air nozzle with the fin in a first position.
Figure 8B:
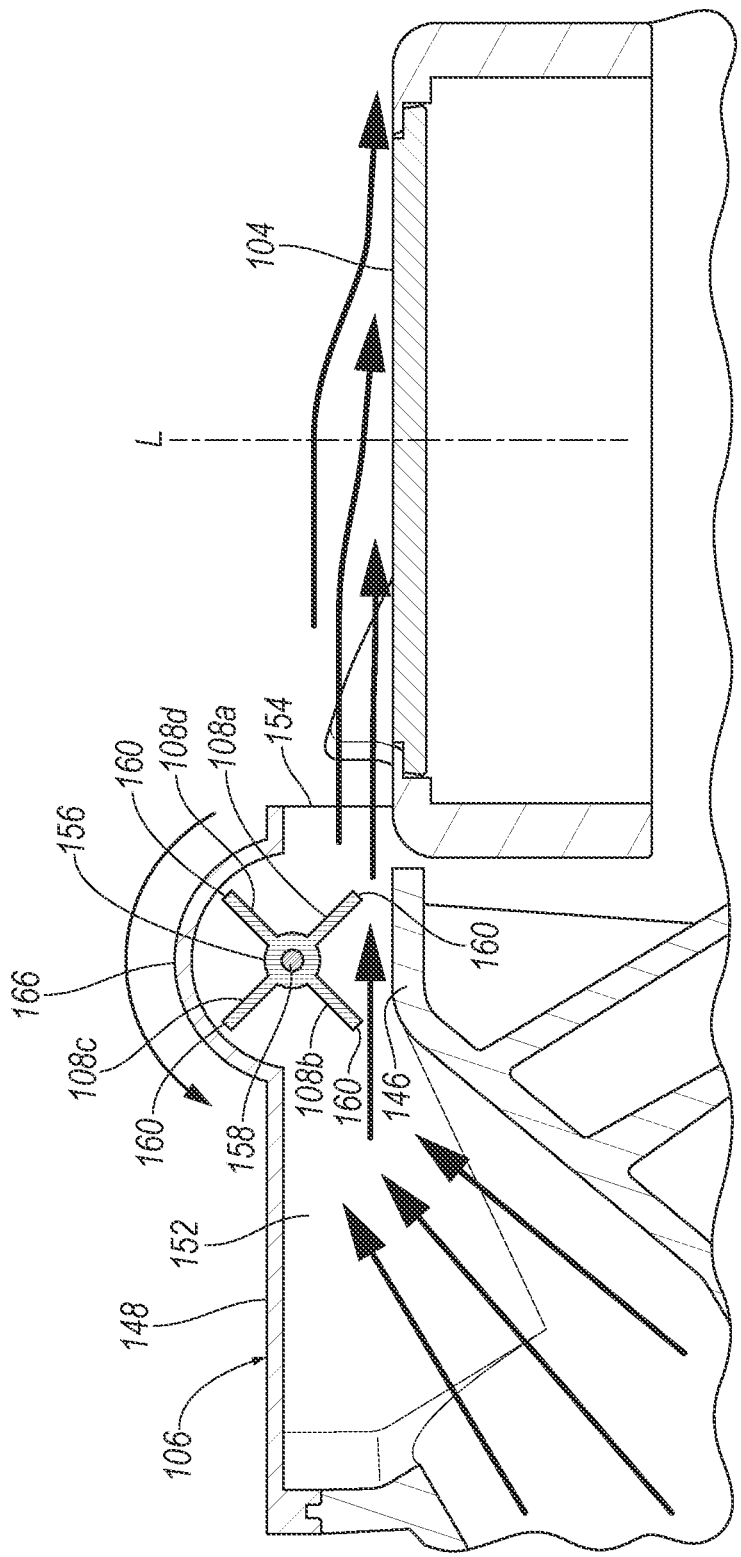
FIG. 8B is a side cross-sectional view of the second example of the air nozzle with the fin in a second position.
Figure 8C:
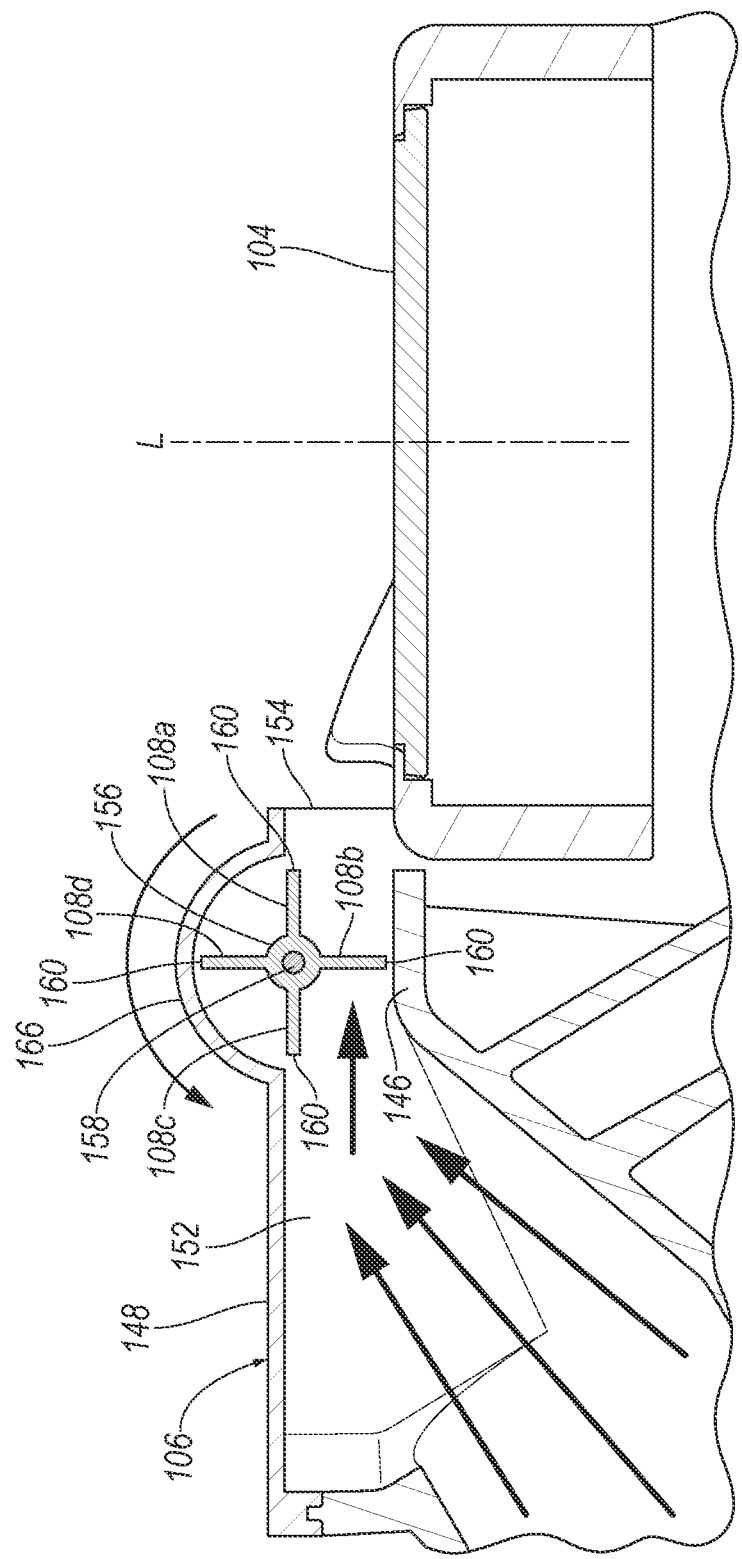
FIG. 8C is a side cross-sectional view of the second example of the air nozzle with the fin in a third position.

With reference to FIGS. 8A-C, the shaft 156 and the fins 108 are freely rotatable together for 360° around the rotation axis R. Each of the fins 108 rotates through the first position, the second position, and the third position in sequence. For example, as shown in FIGS. 8A-C, the first fin 108a is in the first position in FIG. 8A, then the second position in FIG.

8B, and then the third position in FIG. 8C. When the first fin 108a is in the third position, the second fin 108b is in the first position and then rotates to the second position and third position.

The shaft 156 and fins 108 rotate in a single direction, e.g., counterclockwise as viewed in FIGS. 8A-C. The shape of the second wall 148 with the partial cylindrical section 166 permits airflow to, at any given time, push the fins 108 that tend to rotate the shaft 156 and fins 108 in the single direction, i.e., the fins 108 with terminuses 160 spaced from the second wall 148, but the shape of the second wall 148 prevents airflow from pushing the fins 108 that tend to rotate the shaft 156 and fins 108 against the single direction, i.e., the fins 108 with their terminuses 160 against the second wall 148 (i.e., sufficiently close that airflow between the terminus 160 and the second wall 148 is negligible). At least one of the terminuses 160 of the fins 108 is positioned against the second wall 148, e.g., against the partial cylindrical section 166, at each rotational position of the shaft 156 around the rotation axis R, e.g., the third fin 108c in FIG. 8A, the third and fourth fins 108c-d in FIG. 8B, and the fourth fin 108d in FIG. 8C, thereby preventing the airflow from tending to reverse the direction of rotation of the shaft 156 and fins 108.

As air flows through the air nozzle 106, the airflow pushes the fins 108 whose terminuses 160 are spaced from the second wall 148, thereby rotating the shaft 156 and fins 108. As the fins 108 rotate, the air encountering the fins 108 is divided into packets of air located circumferentially between consecutive fins 108, e.g., as the first fin 108a progresses from the first position to the third position in FIGS. 8A-C, the second fin 108b divides the airflow into a packet of air between the first and second fins 108a-b. The packets of air are released in bursts, e.g., as the first fin 108a progresses from the first position to the third position in FIGS. 8A-C, the packet of air between the fourth and first fins 108d,a is propelled forward by the first fin 108a. The intermittent propelling of the air packets by the fins 108 in turn generates pulsing airflow across the sensor lens 104.

The disclosure has been described in an illustrative manner, and it is to be understood that the terminology which has been used is intended to be in the nature of words of description rather than of limitation. The adjectives "first," "second," "third," and "fourth" are used throughout this document as identifiers and are not intended to signify importance, order, or quantity. Many modifications and variations of the present disclosure are possible in light of the above teachings, and the disclosure may be practiced otherwise than as specifically described.

The invention claimed is:

1. A sensor apparatus comprising:
a sensor including a sensor lens;
an air nozzle fixed relative to the sensor lens and positioned to direct airflow out of the air nozzle across the sensor lens; and
a fin positioned inside the air nozzle, the fin rotatably coupled to the air nozzle and rotatable relative to the air nozzle around an axis of rotation, the fin elongated radially from the axis of rotation, the fin rotatable between a first position impeding airflow through the air nozzle and a second position permitting airflow through the air nozzle;
wherein the air nozzle includes four walls arranged to form a rectangular cross-section at the axis of rotation; the fin is elongated radially from the axis of rotation to a terminus of the fin;
the terminus is positioned against a first wall of the walls when the fin is in the first position;
the terminus is spaced from the walls when the fin is in the second position;
the fin is rotatable about the axis to a third position;
the terminus is positioned against a second wall of the walls when the fin is in the third position; and
the second wall is opposite the first wall.

2. The sensor apparatus of claim 1, wherein the air nozzle includes an outlet having a slot shape.

3. The sensor apparatus of claim 2, wherein the slot shape of the outlet is elongated parallel to the sensor lens.

4. The sensor apparatus of claim 1, wherein the axis of rotation is perpendicular to a direction of airflow traveling through the air nozzle.

5. The sensor apparatus of claim 1, wherein the fin is elongated along the axis of rotation from a third wall of the walls to a fourth wall of the walls, the fourth wall is opposite the third wall, and the third wall and fourth wall both extend from the first wall to the second wall.

6. The sensor apparatus of claim 1, further comprising a shaft extending around the axis of rotation, and a counterweight fixed to the shaft and extending radially from the shaft in an opposite direction as the fin is elongated from the axis of rotation, wherein the fin is fixed to the shaft.

7. The sensor apparatus of claim 6, wherein the counterweight is sized to bias the fin toward the second position when the fin is in the first position, and the counterweight is sized to bias the fin toward the second position when the fin is in the third position.

8. The sensor apparatus of claim 1, wherein the first wall is positioned to block the fin from rotating farther from the second position than the first position is located, and the second wall is positioned to block the fin from rotating farther from the second position than the third position is located.

9. The sensor apparatus of claim 1, further comprising a shaft extending around the axis of rotation, and a plurality of fins including the fin, wherein the fins are fixed to the shaft, and each of the fins is elongated radially a same distance from the shaft to a respective terminus.

10. The sensor apparatus of claim 9, wherein at least one of the terminuses of the fins is positioned against the second wall at each rotational position of the shaft around the axis of rotation.

11. The sensor apparatus of claim 9, wherein the second wall includes a partial cylindrical section radially centered on the axis of rotation.

12. The sensor apparatus of claim 9, wherein the shaft and the fins are freely rotatable together for 360° around the axis.

13. The sensor apparatus of claim 1, further comprising a spring coupled to the air nozzle and the fin, wherein the spring is positioned to rotationally bias the fin toward the second position.

14. The sensor apparatus of claim 1, further comprising a blower and a duct positioned to direct airflow from the blower to the air nozzle.

15. The sensor apparatus of claim 14, wherein the sensor lens is a first sensor lens, the air nozzle is a first air nozzle, the fin is a first fin, the duct is a first duct, the sensor apparatus further comprising a second sensor lens, a second air nozzle fixed relative to the second sensor lens and positioned to direct airflow out of the second air nozzle across the second sensor lens, a second fin positioned inside the second air nozzle, and a second duct positioned to direct airflow from the blower to the second air nozzle.

16. The sensor apparatus of claim 15, further comprising a housing, wherein the blower, the first duct, and the second duct are positioned inside the housing.

17. The sensor apparatus of claim 16, wherein the housing includes an exterior wall, the first sensor lens defines a field of view through the exterior wall, and the second sensor lens defines a field of view through the exterior wall.

\* \* \* \* \*